United States Patent [19]

Ueda et al.

[11] Patent Number: 4,970,047

[45] Date of Patent: Nov. 13, 1990

[54] FUEL ASSEMBLY FOR NUCLEAR REACTORS

[75] Inventors: Makoto Ueda, Yokohama; Toru Mitsutake, Ebina; Koichi Sakurada, Narashino; Koji Hiraiwa, Zushi; Yasuhiro Hattori, Yokohama; Mamoru Nagano, Yokohama; Hironori Echigoya, Yokohama, all of Japan

[73] Assignee: Kabushiki Kaisha Toshiba, Kawasaki, Japan

[21] Appl. No.: 256,576

[22] Filed: Oct. 13, 1988

[30] Foreign Application Priority Data

Oct. 13, 1987 [JP] Japan .................................. 62-256191
Oct. 17, 1987 [JP] Japan .................................. 62-260810
Nov. 7, 1987 [JP] Japan .................................. 62-280313

[51] Int. Cl.$^5$ ............................................. G21C 3/32
[52] U.S. Cl. .................................... 376/443; 376/439
[58] Field of Search ............... 376/434, 438, 439, 443, 376/444, 448, 457

[56] References Cited

U.S. PATENT DOCUMENTS 4,749,543  6/1988  Crowther ........................... 376/443
4,749,544  6/1988  Crowther ........................... 376/443

FOREIGN PATENT DOCUMENTS 53-43193    4/1978  Japan .
55-55284    4/1980  Japan .
57-175286  10/1982  Japan .

Primary Examiner—Donald P. Walsh
Attorney, Agent, or Firm—Foley & Lardner, Schwartz, Jeffery, Schwaab, Mack, Blumenthal & Evans

[57] ABSTRACT

A fuel assembly for a nuclear reactor comprises a fuel bundle in which a number of fuel rods are regularly arranged and a channel box surrounding the outer periphery of the fuel bundle. The interior of the channel box is designed so that the inner cross sectional area of the channel box increases from the upstream side of the coolant flow towards the downstream side thereof, for example, by stepwisely shaving the inner surface of the channel box. The corner portions of the channel box may be chamfered to improve the stress due to the inner pressure.

8 Claims, 25 Drawing Sheets

| LOWER TIE PLATE | SPACER SP | UPPER TIE PLATE |
| LTP SP1 SP1 SP3 SP4 SP5 SP6 SP7 UTP |

|◄──── ACTIVE FUEL PORTION ────►|

CONVENTIONAL TECHNIQUE

THIS INVENTION

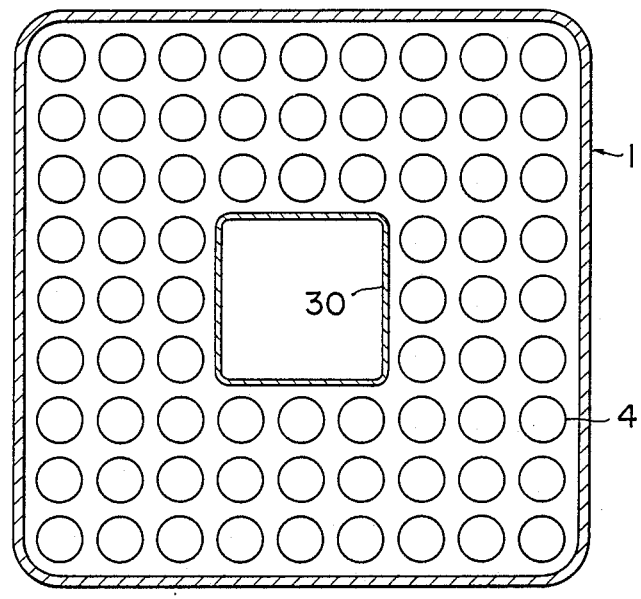
F I G. 9
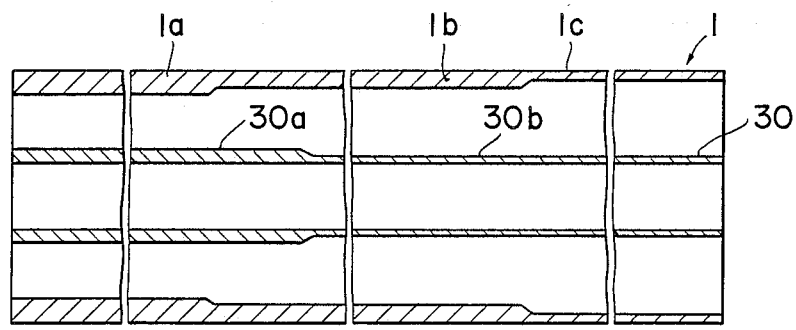
F I G. 10

FUEL ASSEMBLY FOR NUCLEAR REACTORS

BACKGROUND OF THE INVENTION

This invention relates to a fuel assembly for a nuclear reactor and more particularly, to a fuel assembly for a boiling water reactor capable of ensuring a long operation cycle for fuel economy and of maintaining a high thermal margin.

A fuel assembly for a boiling water reactor (BWR) is constructed by a square channel box in which a number of fuel rods each comprising a metallic clad, fuel bundle, in which nuclear fuel material are packed are regularly arranged. The reactor core of the BWR includes a plurality of cells each comprising a cruciform control blade and four fuel assemblies surrounding the control blade, these cells being arranged in a regulated manner in the core. Namely, each fuel assembly and control blade have axes perpendicular and parallel to each other, and a coolant operated as a moderator flows from the lower portion towards the upper portion of the reactor core.

Concerning the BWR, steam voids are not formed in the bottom portion of the effective core portion, i.e. the lower end of a heat generating portion at which an exothermic reaction is performed, but many voids are generated at areas other than the bottom portion of the reactor core, and the void fraction in the moderator passage located above the central portion thereof is made considerably high, for example in excess of 70% near the upper end of the reactor core. As the void fraction increases, the flow speed of the coolant as moderator necessarily increases because the cross section in a direction normal to the axis of the coolant passage is made a constant height within the channel box. Friction of the passage increases in proportion to approximately the square of the flow speed of the coolant, so that the pressure loss rate of the coolant becomes large at the central portion of the reactor core toward the upper portion thereof.

The pressure loss rate of the coolant with respect to the unit length of the reactor core, $\Delta P_T/\Delta Z$, will be represented by the sum of the following four factors.

$$\frac{\Delta P_T}{\Delta Z} = \frac{1}{\Delta Z}(\Delta P_h + \Delta P_a + \Delta P_f + \Delta P_L)$$

in which
$\Delta P_h$: Position Loss,
$\Delta P_a$: Acceleration Loss,
$\Delta P_f$: Friction Loss, and
$\Delta P_L$: Local Loss (due to the location of spacers, for example).

The most significant of these four factors in a position including no spacers is the friction loss, which is represented as follows:

$$\frac{\Delta P_f}{\Delta Z} = f \cdot \frac{(M/A)^2}{2\rho g}$$

in which
M: Mass Flow Rate of Moderator (water),
A: Moderator Flow Passage Area,
p: Moderator Density,
g: Gravity Constant,
f: Friction Loss Coefficient of Fuel Bundle and
$\Delta P_f$: Friction Loss of Fuel Bundle.

The flow of the coolant is mainly caused by a drain pressure at the outlet port of a recirculation pump, and accordingly, the large pressure loss means that a large force has to be imparted to the pump, resulting in an enlargement of the machinery or system utilized and the consequent lowering of the power generation efficiency. The reduction of the pressure loss will therefore result in the reduction of the force or power to be imparted to the pump.

Recently, various studies or attempts have been carried out or tried in view of the improvement of the economics of the nuclear power plant. For example, it has been found out through these studies that the neutron multification factor during the reactor operation period is improved by changing the gaps between the respective fuel rods in the fuel bundle, thereby achieving the elongation of the operation cycle of the reactor and hence improving the burning efficiency. The improvement (increase) of the neutron multification factor during the reactor operation period is based on the improvement (increase) of the resonance escape probability due to the mutual shielding effects of the fuel rods, and on the fact that the extent of the disadvantage of the usage of the thermal neutrons, which may become somewhat disadvantageous, can be suppressed during the high-temperature reactor operation period. Japanese Patent Laid-Open Publication No. 75378/1987 of the same inventors and others as that of this application, discloses the above-described technique to some extent.

However, the fact that the gaps between the fuel rods are changed in the fuel bundle provides a problem regarding the configuration where there are portions through which the coolant passses easily and those for which it does not. This requires new means to be taken with respect to it. The smooth flow of the moderator will make it difficult to ensure a sufficient reactor thermal margin and the soundness of the fuel.

SUMMARY OF THE INVENTION

An object of this invention is to substantially eliminate the defects and drawbacks encountered in the conventional technique described above and to provide an improved fuel assembly particularly constituting a reactor core of a boiling water reactor capable of improving the thermal margin of the reactor core, the reactor characteristics, and the fuel economy.

Another object of this invention is to provide a fuel assembly comprising a channel box constructed for the improvement of the coolant flow to maintain the thermal margin and to ensure the soundness of the fuel.

These and other objects can be achieved according to this invention by providing a fuel assembly for a nuclear reactor comprising a fuel bundle in which a number of fuel rods are regularly arranged by means of spacers and a channel box disposed so as to surround the outer periphery of the fuel bundle and having a wall structure constructed so that an inner cross sectional area of the channel box increases from an upstream side of the coolant flow towards the downstream side thereof.

The basic principle of this invention will be described hereunder.

The pressure loss due to the coolant in the axial direction of the fuel assembly is mainly caused at the downstream portion in which the coolant flows as two-phase flow. Accordingly, the speed of the two-phase flow is reduced by enlarging the flow passage of the coolant at the axially downstream portion and hence the increase in the pressure loss can be suppressed.

In view of the above facts, it was found that a portion of the channel box of the fuel assembly having an excess thickness corresponds to a portion to which the enlargement of the flow passage is required in consideration of the problems on the stress and the creep phenomenon.

Furthermore, in consideration of the axial distribution of the creep phenomenon on the basis of the axial distribution of the stress in the channel box, the neutron irradiation and the inner pressure in the channel box, various functions and effects in the reactor core can be availably achieved by suitably setting or designing the thickness of the wall structure of the channel box. Namely, it is necessary to make the channel box thick at the lower portion thereof, i.e. the upstream side of the coolant flow, at which the inner pressure due to the coolant flow is relatively high. In particular, the portion of the channel box near the upstream end thereof and to which neutrons are greatly irradiated, cannot be made thin for the reason that a channel creep phenomenon, in which the wall structure of the channel box is outwardly swollen by the continuous application of the inner pressure, is caused at this portion.

The thickness of the wall structure of the channel box at or near the axially central portion may be made thin in comparison with the lower portion of the channel box described hereinabove in consideration of reduced inner pressure and stresses applied during earthquake for instance, but it is desired to avoid the large reduction of the thickness of the channel box. The stress distribution due to an earthquake becomes largest at the axially central portion of the channel box, but the stress is usually lower than the inner pressure in the channel box. The location of the stepped portion of the wall thickness of the channel box in the central portion thereof should be avoided because of the concentration of stress on that stepped portion during earthquakes, for example.

In the upper portion of the channel box, stresses due to the inner pressure and earthquakes and the inner pressure itself are small, so that channel creep phenomenon hardly occurs in the upper portion of the channel box, and accordingly, it becomes possible to make wall structure of the channel box thin at the upper portion thereof. However, it may be better to make the channel box slightly large at an upper portion abutting an upper lattice or upper tie plate in consideration of the stress which may be caused by strong earthquakes.

The present invention was conceived on the basis of the studies and principles described above and the described objects can be achieved by the fuel assembly of this invention.

The improved effects and advantages according to this invention will be listed hereunder.

(1) The pressure loss can be effectively reduced to enable the driving force of a pump to be also reduced and hence the economy of the power plant improved. Moreover, it becomes possible to increase the flow rate of the coolant to more than that of the usual operation period at the final stage of the operation cycle and the core reactivity can be increased by lowering the void fraction, also resulting in the improvement of the power plant economy.

(2) The reduction of the thickness of the wall structure of the channel box results in the increasing of the volume of the coolant as a moderator, so that the neutron moderating effect is increased and hence the neutron multiplication factor is increased in high power operation period, while the factor is decreased in reactor shut-down period due to decrease of thermal utilization factor.

(3) Since the inner surface of the channel box is effectively shaved off, the coolant flow near the inner surface can be improved, so that the concentration of the coolant in the wide flow passage in the fuel bundle can be effectively alleviated and hence the thermal margin of the entire fuel assembly can be widely improved, thus ensuring the soundness of the fuel.

(4) Since the flow speed of the coolant at the downstream side thereof can be reduced, the difference in the immigration speeds between the coolant and the voids, i.e. slipping phenomenon, is increased and the void fraction is lowered.

(5) Accordingly, the output power is increased at the downstream side of the reactor core, which is more available for BWR in which the output power at the downstream side of the core tends to be lowered, and hence the axial power distribution in the core can be made flat. The soundness of the fuel can therefore be effectively ensured.

(6) As described hereinabove, the lowering of the void fraction at the upper portion of the reactor core results in the suppression of the core reactivity loss due to the voiding in the coolant. This is available for the improvement of the reactor operation cycle although the degree is slight. In addition, the suppression of the core reactivity loss may somewhat contribute to the suppression of an abnormal core reactivity increasing in the case of transient lowering of the void fraction.

The preferred embodiments according to this invention will be described hereinafter in further detail with reference to the accompanying drawings.

BRIEF DESCRIPTION OF THE DRAWINGS

In the accompanying drawings:

FIG. 1 shows a channel box of a fuel assembly according to this invention, in which

FIG. 4 includes FIGS. 4A to 4C describing the combined stress acting on the channel box according to this invention, in which

FIG. 6 describes the operation of the fuel assembly shown in FIG. 2, in which

FIG. 9 is a cross sectional view of the second embodiment of the fuel assembly according t this invention;

FIG. 10 is an elevational section of the channel box including a square-shaped water rod of the fuel assembly shown in FIG. 9;

FIG. 11 includes views describing the operation of the fuel assembly of the second embodiment, in which

FIG. 15 represents the fourth embodiment according to this invention, in which FIG. 15A is an elevational section of the channel box, FIGS. 15B to 15D are cross sections taken along the lines B—B to D—D of FIG. 15A, and FIG. 15E is an enlarged view of an encircled portion of FIG. 15B;

FIG. 17 represents the channel box according to the sixth embodiment of this invention in which

DESCRIPTION OF THE PREFERRED EMBODIMENTS

Figure 1A:
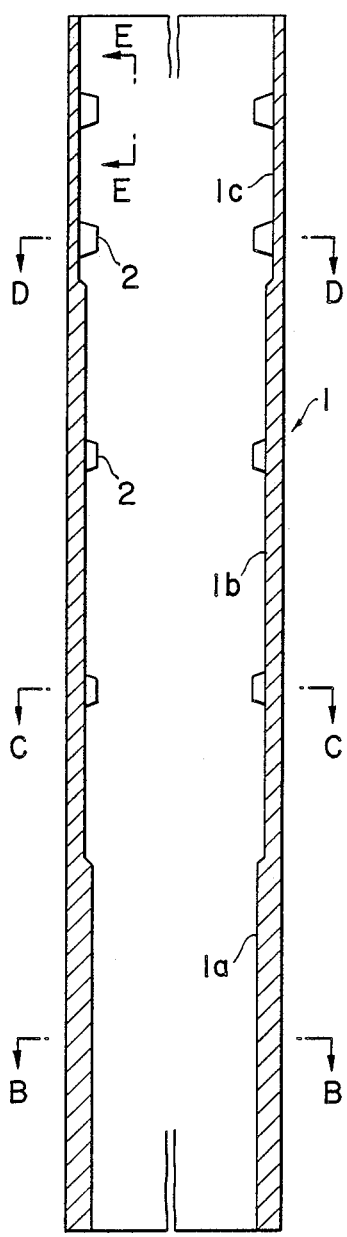
FIG. 1A is an elevational section thereof.
Figure 1E:
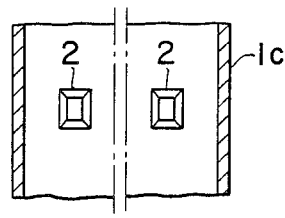
FIG. 1E is a front view of a spacer abutment as viewed from the line E—E of FIG. 1A.
Figure 1D:
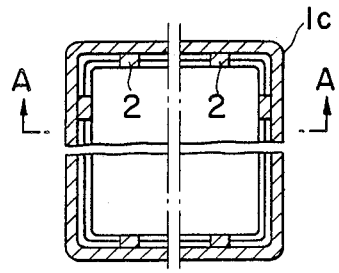
FIGS. 1B to 1D are cross sectional views taken along the lines B—B to D—D shown in FIG. 1A.
Figure 1C:
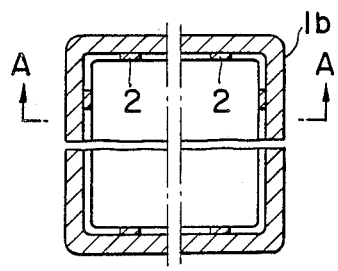
Figure 1B:
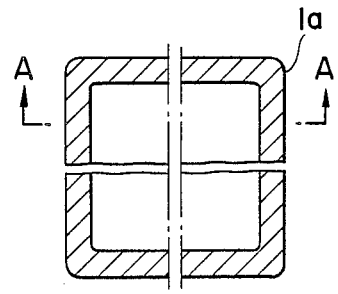

A fuel assembly according to the first embodiment of this invention is constructed by fuel bundle of a coarse and dense or loose-tight arrangement of fuel rods charged in a channel box 1 having a uniform outer configuration, and the fuel bundle constructed by nine sub-channels each comprising nine fuel rods 4 in an arrangement of three lines and three rows, each being spaced with a gap g from the adjacent ones. A round water rod 3 having a relatively large diameter is arranged at substantially the central portion of these subchannels.

The inner surface of the channel box is shaved off, as shown in FIGS. 1A to 1D, to make thin towards the downstream side of the reactor core as denoted by the reference numerals 1a, 1b and 1c. To make the wall of the channel box 1 thin in a stepwise manner as shown, makes the location of the fuel bundle unstable except for the lower portion thereof, and in order to eliminate this defect, spacer abutments 2 are secured to the inner surface of the channel box 1 to settle the horizontal stability of the fuel bundle abutting spacers 5 (FIG. 4) and the spacer abutments 2.

Figure 2:
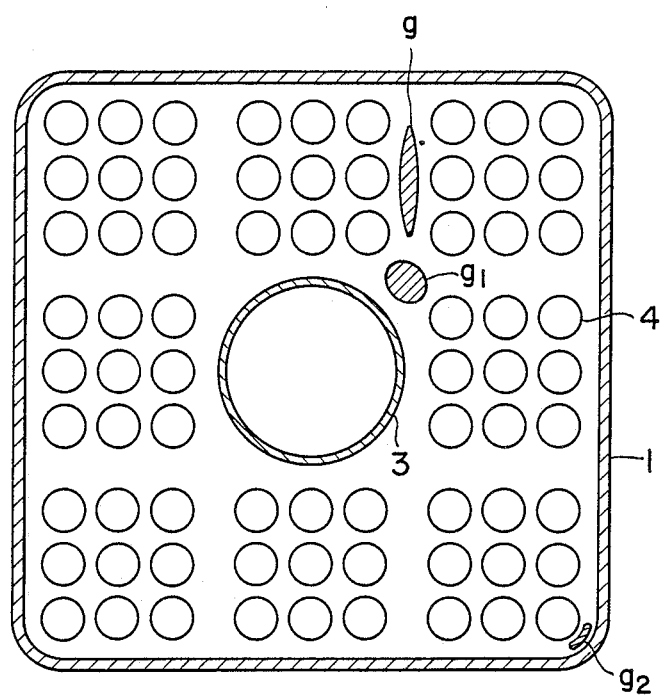
FIG. 2 is a cross sectional view of the fuel assembly of the first embodiment according to this invention.

According to the fuel assembly of this embodiment, as shown in FIG. 2, the coolant is likely to gather in a gap g1 such as a gap g between the respective subchannels or between the gap g and the water rod 3, so that the inner surface of the channel box 1 is shaved off in a stepped manner as shown in FIG. 1A towards the lower portion of the channel box to thereby ensure the easy flow of the coolant. In another aspect, since gaps g2 between the corner portions of the channel box 1 and the fuel rods 4 arranged near are made narrow, the flow of the coolant passing therethrough is likely to be made worse and the cooling ability is lowered. The technique of shaving off the inner surface of the channel box 1 thin is therefore effective for improving the smooth flow of the coolant through the gaps g2.

The operation of the first embodiment will be explained hereunder in view of the stress applied to the channel box 1.

Figure 3A:
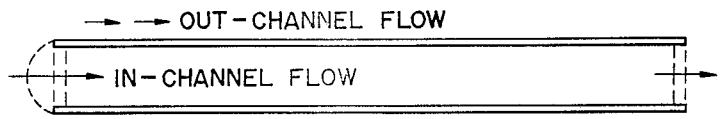
FIGS. 3A to 3D are views describing the operation of the fuel assembly of the first embodiment shown in FIG. 2.
Figure 3B:
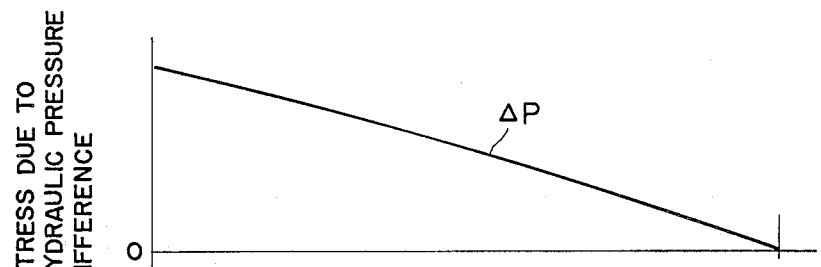
Figure 3C:
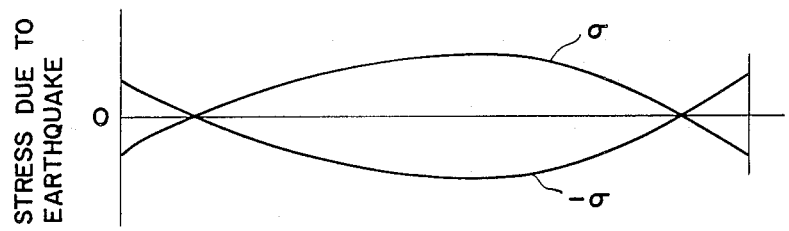
Figure 3D:
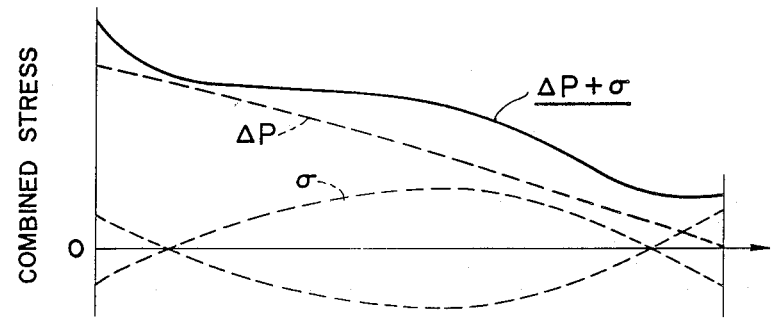

The coolant flows along the inner and outer surfaces of the channel box 1 as in and out channel flows as shown in FIG. 3a, and a stress $\Delta P$ created by a hydraulic pressure difference between the inside and the outside of the channel box, is made large at the upstream side therein as shown in FIG. 3B. The stress $\sigma$ in an occurrence of an earthquake is considered to be a horizontal vibration, but the maximum stress $\sigma$ is applied to the channel box at a portion shifted somewhat upward from the central portion thereof because the lower end of the channel box is substantially firmly secured and the upper end thereof is slightly changeably secured. Accordingly, the combined stress $\Delta P + \sigma$ applied to the channel box will be represented by curves shown in FIG. 3D. It is a matter of no significance that the inside surface or the outside surface of the channel box should be cut to obtain a thin wall thickness as far as the analysis of the combined stress to such extent is concerned, and either the inside or outside surface may be cut.

Figure 4A:
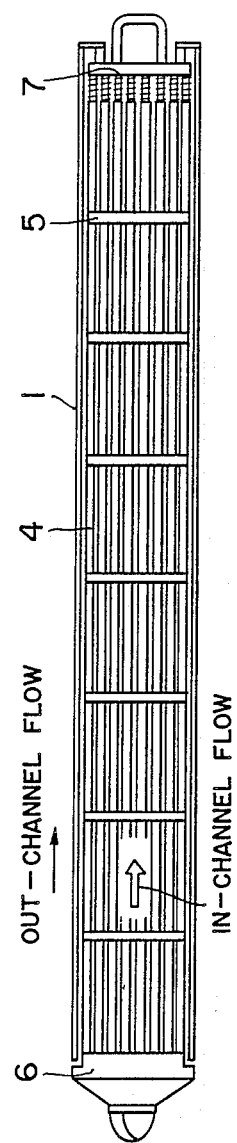
FIG. 4A is an elevational section of the fuel assembly.
Figure 4B:
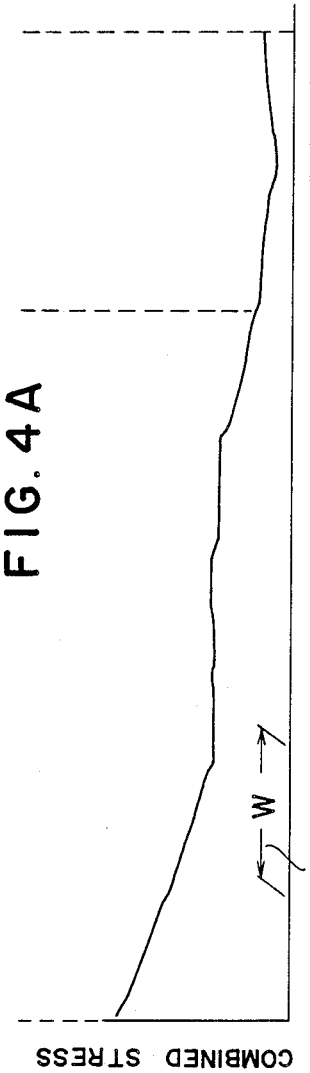
FIG. 4B shows a graph of the combined stress acting on the channel box and FIG. 4C is an elevational section of the channel box.
Figure 4C:
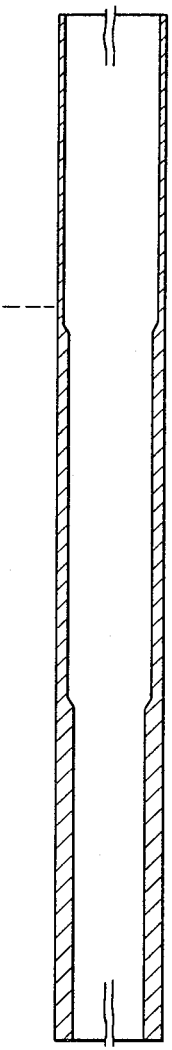

FIG. 4 is a view describing the stress applied to the channel box in view of the channel creep phenomenon in addition to the analysis of the combined stress described in FIG. 3.

FIG. 4A is an illustration indicating the structure of a usual fuel assembly, in which the fuel bundle comprising the fuel rods 4 regularly supported and arranged by the spacers 5 is accommodated in the channel box 1 having an upper end supported by an upper tie plate and a lower end supported by a lower tie plate 6.

Figure 5A:
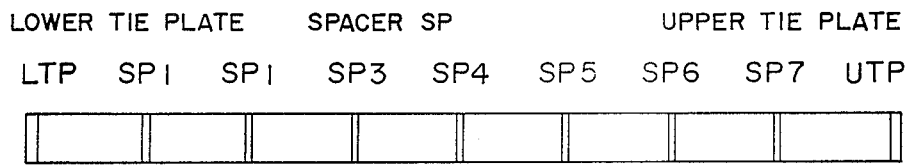
FIGS. 5A to 5E are views describing the channel box of the first embodiment of this invetion in a thermohydraulic terms.
Figure 5B:
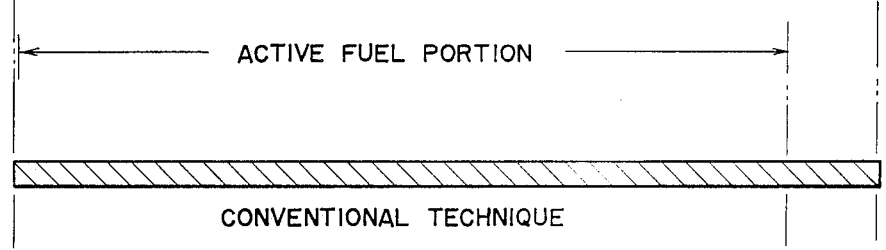
Figure 5C:
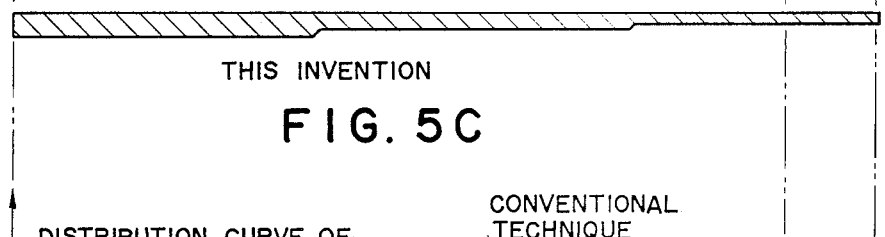
Figure 5D:
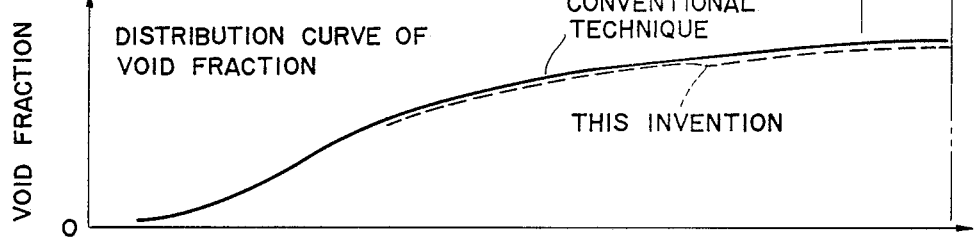
Figure 5E:
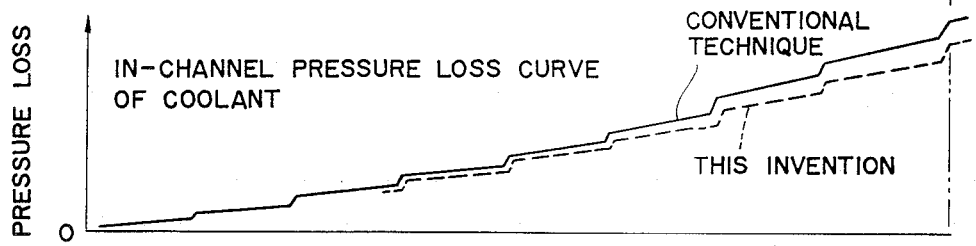

The channel creep phenomenon is caused by the pressure difference between the inside and the outside of the channel box and by the irradiation of neutrons, with this phenomenon being likely to occur in a range w shown in FIG. 4B at a portion of the upstream side in the channel box, so that the thickness of the channel box wall is made large at the upstream side of this portion. The combined stress applied to a portion at the downstream side of this portion is not substantially changed. The combined stress is further reduced at a portion upstream from a portion apart from the upper end of the channel box by a distance of about ⅓ of the length of the whole length thereof, so that the thickness of the channel box 1 is made thin in a stepped manner in accordance with the lowering of the combined stress. FIGS. 5A to 5E are views for explaining the channel box according to this invention on the basis of thermohydraulics. FIG. 5A shows an arrangement of the fuel assembly and particularly the spacers. FIG. 5B is a sectional view of one wall structure of a conventional channel box and FIG. 5C is also a sectional view of one wall structure of a channel box according to this invention. FIG. 5D is a graph for the comparison of the distribution curve (broken line) of the void fraction by the utilization of the channel box (FIG. 5C) of this invention with the distribution curve (solid line) of the void fraction by the utilization of the conventional channel box (FIG. 5B), and as shown in FIG. 5D, the broken line according to this invention has the void fraction slightly lower than the solid line according to the conventional technique, because of the slip from the aqueous phase. FIG. 5E shows curves representing the in-channel pressure losses of the coolant of both types of channel boxes, and as shown in FIG. 5E, the pressure loss according to this invention (broken line curve) is smaller than that of the conventional channel box (solid line curve).

Figure 6A:
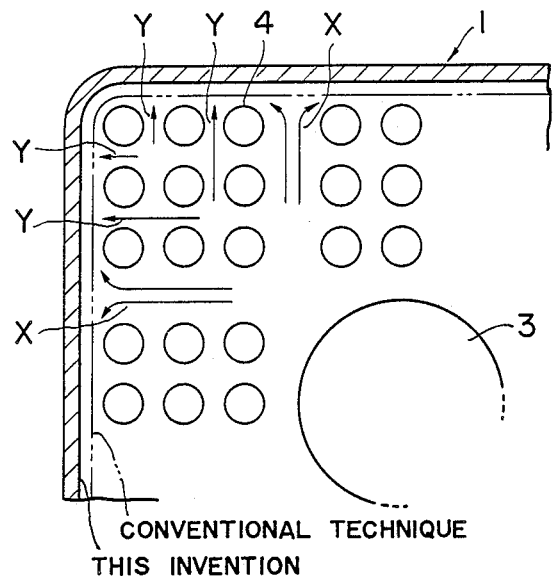
FIG. 6A is a partial cross sectional view of a corner portion of the fuel assembly and FIG. 6B is a view representing a thermal critical power with respect to the coolant mass velocity.
Figure 6B:
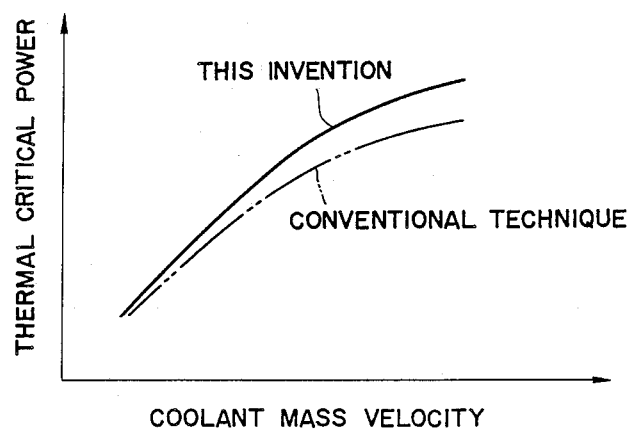

FIG. 6 describes the operation or action of the coolant in the fuel assembly through the utilization of the channel box according to this invention. As shown in FIG. 6A, according to this invention, the coolant, which is likely to concentrate in the outer periphery of the water rod 3 arranged centrally in the fuel bundle and the wide gaps, flows in the arrowed direction X, thus alleviating the concentration of the coolant in the portions described above. The coolant flows from a subsidiary passage of a tight portion towards the outermost peripheral portion, i.e. a portion near the inner surface of the channel box is directed by the arrow Y, and accordingly, the flow speed at the tight portion decreases. As this result, peeling of liquid film from the surface of the fuel rod 4 can be suppressed. The thermal critical power of the reactor utilizing the channel box according to this invention can be improved in comparison with the conventional one, and FIG. 6B shows this fact in which the broken line represents this invention and the solid line represents the conventional technique.

Figure 7:
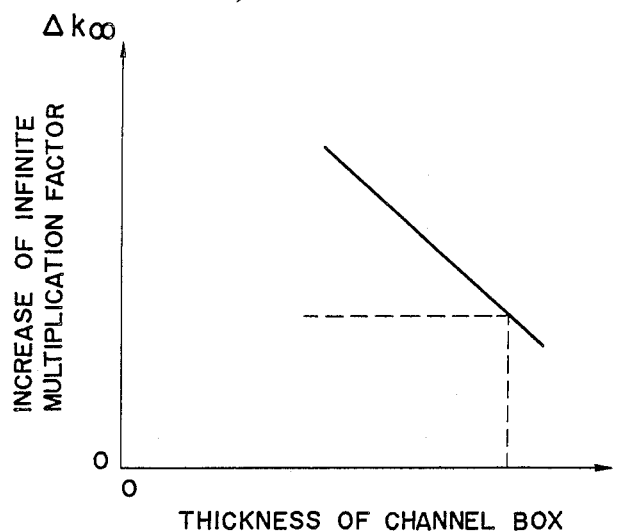
FIG. 7 shows a graph representing the relationship between the infinite multiplication factor and the thickness of the channel box during the high-temperature reactor operation period.
Figure 8:
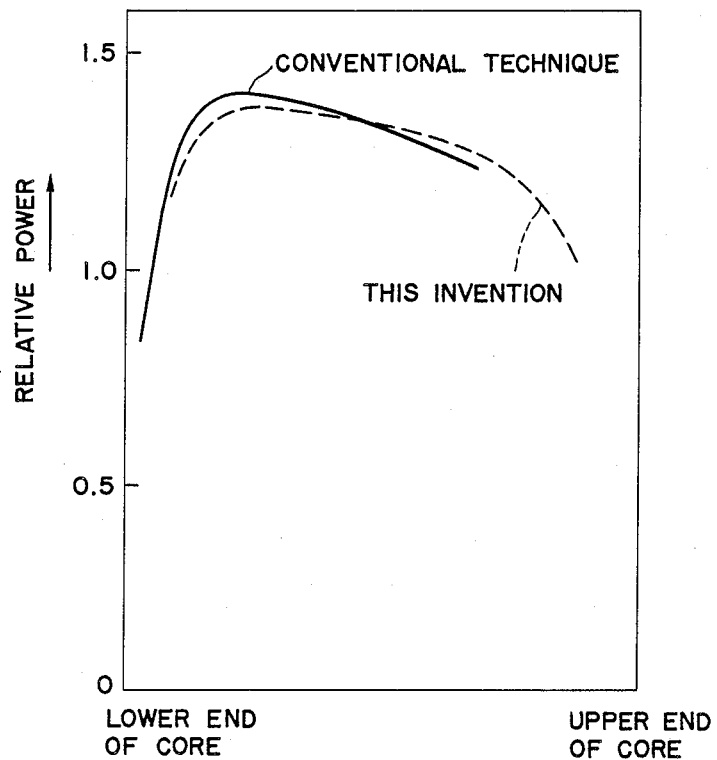
FIG. 8 is a graph representing a relative power distribution in the axial direction of the core.

In addition, according to this invention, since the wall structure of the channel box is made thin, the infinite multiplication factor $K_\infty$ further increases in addition to the increase thereof due to the coarse and dense arrangement of the fuel rods in the fuel bundle according to this invention. As shown in FIG. 7, the infinite multiplication factor $K_\infty$ increases during the high-temperature reactor operation period. Therefore, the elongation of the operation cycle can be achieved and the reactor economy also improved. Moreover, the amount of the coolant as a moderator is increased in the upper half of the reactor core, so that the output power at the upper half portion of the reactor core can be increased and the axial power distribution during the reactor operation cycle made flat (dotted line) as shown in FIG. 8, thus improving the soundness of the fuel in comparison with the conventional technique (solid line). The increase in the coolant flow at the downstream side thereof in the channel box can be distributed to the alleviation of the shortage of the coolant during the reactor operation period, but during the operation stop (shut down) period, the moderator exists excessively and the neutron absorption rate in the moderator is increased, that is, the thermal neutron utilization factor is decreased to improve the subcriticality of the reactor, and hence the reactor shut-down margin can be sufficiently maintained.

Above mentioned improved effects and advantages according to the first embodiment of this invention can be also achieved by arranging the fuel rods 4 in the channel box 1 regularly in nine lines and nine rows.

FIG. 9 represents a fuel assembly according to the second embodiment of this invention having a structure in which a large square-shaped water rod 30 of a size corresponding to nine fuel rods is arranged at substantially the central portion of the channel box in a cross section and the fuel rods 4 are also arranged in the other space in the channel box regularly in nine lines and nine rows.

The water rod 30 has a thinner wall portion 30b, as shown in FIG. 10, the thickness of which is made thin by shaving off the outer surface thereof for increasing the flow of the coolant near that portion, and the wall thickness of the channel box 1 is made thin by shaving the inner surface in a stepwise manner as described hereinbefore with respect to the first embodiment o this invention as denoted by the reference numerals 1a, 1b and 1c to increase the flow area inside the channel box 1.

Figure 11A:
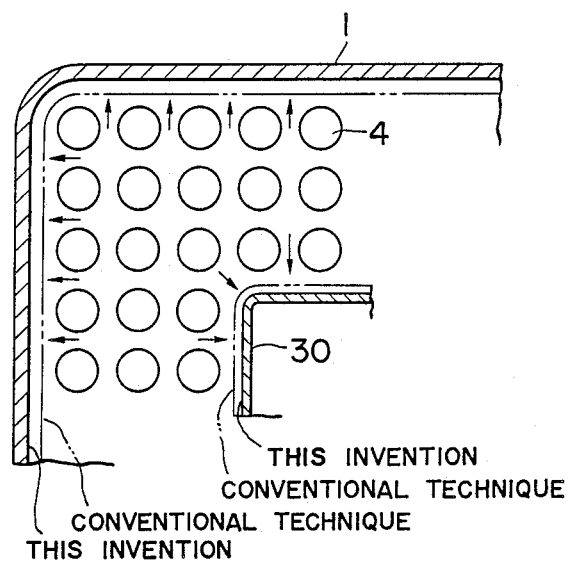
FIG. 11A shows a partial cross section of one corner portion of the fuel assembly and FIG. 11B is a graph showing the relationship between the thermal critical power and the coolant mass velocity.
Figure 11B:
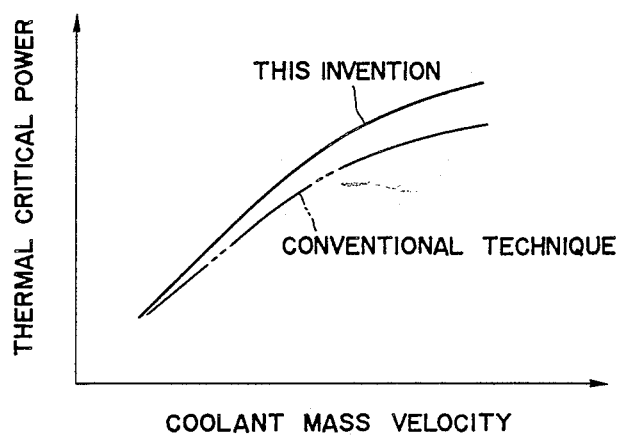

According to this second embodiment, as shown in FIG 11A, the inner surface of the channel box 1 and the outer surface of the square water rod 30 are shaved to make these portions thin, so that the local flows of the coolant will be directed in the arrowed directions. The axial flow speed of the coolant in the fuel bundle decreases due to these local flows and accordingly, the peeling-off phenomenon of the liquid film from the surfaces of the fuel rods 4 can be significantly suppressed. Accordingly, as shown in FIG. 11B, the thermal critical power of the reactor according to the second embodiment (solid line) can be improved in comparison with the conventional technique (dotted line).

Figure 12:
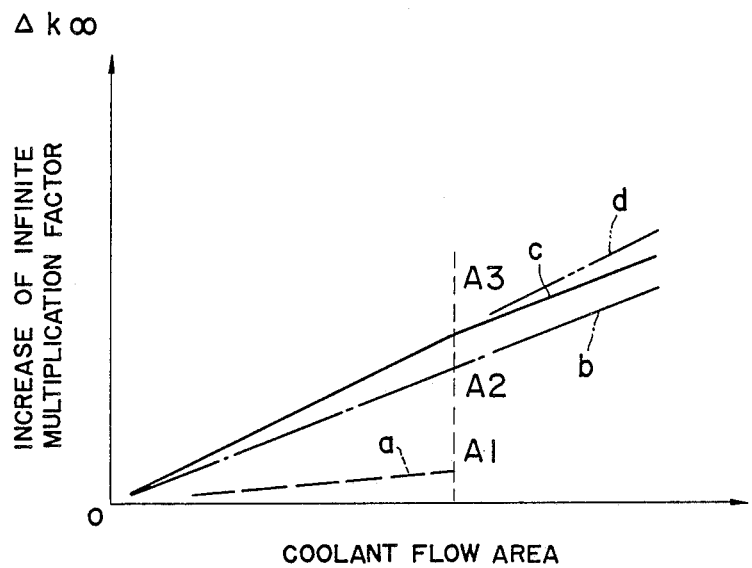
FIG. 12 is a graph representing the relationship between the infinite multiplication factor and the enlarged area of the boiling coolant flow passage during the high-temperature power operation period.

The channel box of the second embodiment has a wall structure having a thickness of 2.0 to 3.0 mm and partially about 1 mm in an axial direction, and the water rod has a wall structure usually having a thickness of 1.0 to 1.5 mm. To design the wall structure of the water rod so as to have a portion having a thickness of less than 0.5 mm provides a problem in a mechanical strength of the water rod. Accordingly, as viewed in FIG. 12, it will be inhibited to reduce the thickness of the wall structure of the water rod rightwardly of the point A1 to obtain the elongated coolant flow passage area. Regarding the thickness of the wall structure of the channel box, the thickness can be further reduced in the range rightward of the point A2 in FIG. 12. As described above, the line showing the combined effect is bent at the point A3 as shown in the line c from the line d, the line c rising rightwardly upwardly and parallel to the line b. Namely, FIG. 12 shows the fact that the line c is obtained for showing the combined effect of the line b representing the effect due to the shaving of the inner surface of the channel box and the line a representing the effect due to the shaving of the outer surface of the water rod.

The infinite multiplication factor $K_\infty$ increases substantially linearly in accordance with enlarged flow area (combined area), so that the operation cycle of the fuel assembly according to this invention can be significantly elongated and the fuel economy also improved. In addition, since the amount of the coolant as a moderator is increased in the upper half of the reactor core, the output power at that portion increases and the axial power distribution can be made flat as shown by the dotted line in FIG. 8 with respect to the aforementioned first embodiment. The soundness of the fuel can be also improved in comparison with the conventional fuel assembly.

Figure 14A:
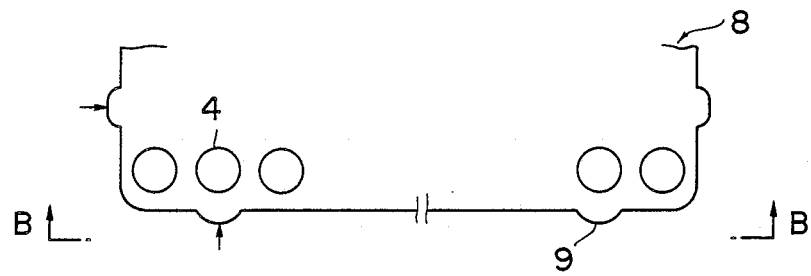
FIG. 14A is a brief partial plan view of a spacer to be used for the fuel assembly shown in FIG. 13.
Figure 14B:
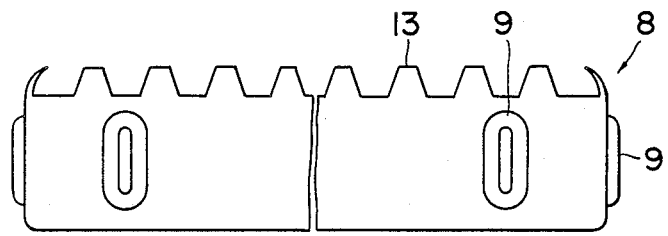
FIG. 14B is a front view as viewed from the B—B line direction in FIG. 14A.
Figure 13:
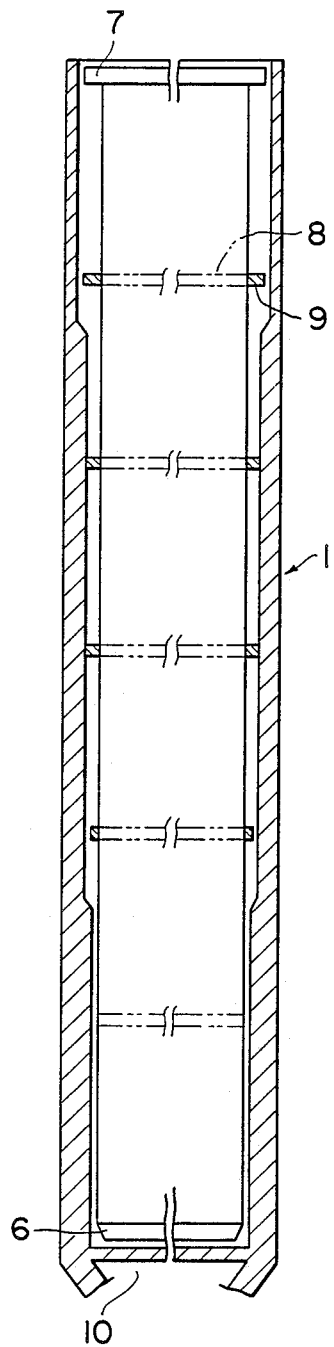
FIG. 13 is an elevational section of a fuel assembly of the third embodiment according to this invention.

FIG. 13 is a sectional view of a fuel assembly according to the third embodiment of this invention, in which a lower nozzle member 10 is integrally combined with the channel box 1 and the lower nozzle member 10 has a structure separable from the lower tie plate 6. Accordingly, with the fuel assembly of this character, the fuel bundle to be secured to the upper tie plate 7 can be inserted into or drawn out from the interior of the channel box 1. For this operation, abutment members are secured to the outer peripheral surfaces of the respective spacers 8 so as to abut against the shaved inner surface of the channel box 1 as shown in FIG. 14, and since the inner surface is shaved in a stepped manner, the upper abutment members 9 have horizontally extending lengths larger than those of the lower abutment members.

Figure 15:
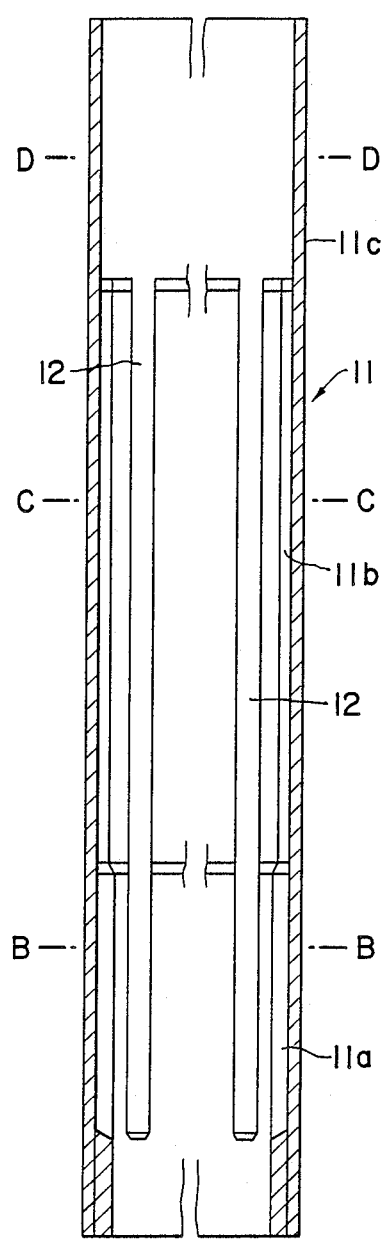
Figure 15:
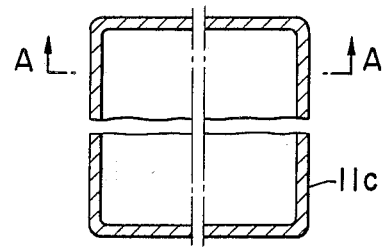
Figure 15:
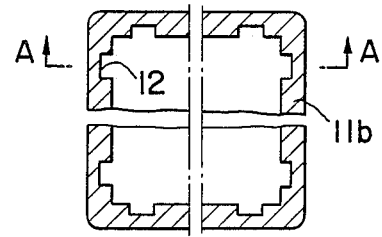
Figure 15:
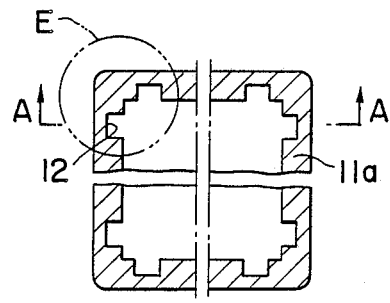
Figure 15:
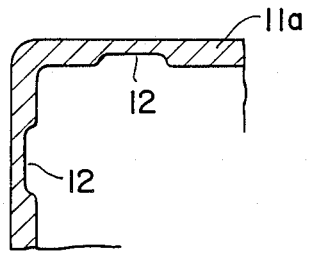

FIG. 15 represents the fourth embodiment of this invention, in which the inner surface of the wall structure of the channel box 11 is made thin in a stepwise manner, i.e., 11a, 11b and 11c as shown in FIGS. 15A to 15D, and particularly in which, as shown in FIG. 15E, the inner surface of the channel box 11 is provided with cut-in grooves 12 having a size through which the abutment members 9 of the spacers 8 can be inserted. According to this engagement, the mounting of the channel box 11 can be stably achieved, and moreover, the horizontal vibration of the fuel bundle in the channel box 11 can be also effectively prevented. It is preferred that each groove 12 extends downwardly to a portion somewhat below the location of the lowermost spacer (SP1 of FIG. 5A). The reason why the grooves 12 do not extend to the lower end portion of the channel box 11 is as a countermeasure against the leak flow of the coolant for the channel box and against the large inner pressure in the channel box. An outward large stress is generated at each inner corner portion of the channel box due to the inner pressure of the coolant, so that the thickness 11a of the corner portion is made large. Namely, since the outward stress at the corner portion and the inner stress at the side surface except the neiborhood of the corner portion are balanced at a portion in which the groove 12 is formed at which the stress is made small, it is possible for that portion to resist the stress even if the thickness thereof is made thin by forming the grooves 12 through which the abutment member of the spacer is inserted. The inner stress in proportion to the inner pressure is applied to a portion continuous to that portion of the channel wall, so that it is impossible for the continuous portion to make the thickness thereof thin, but possible to make the portion near the corner portion thin in comparison with.

Figure 16:
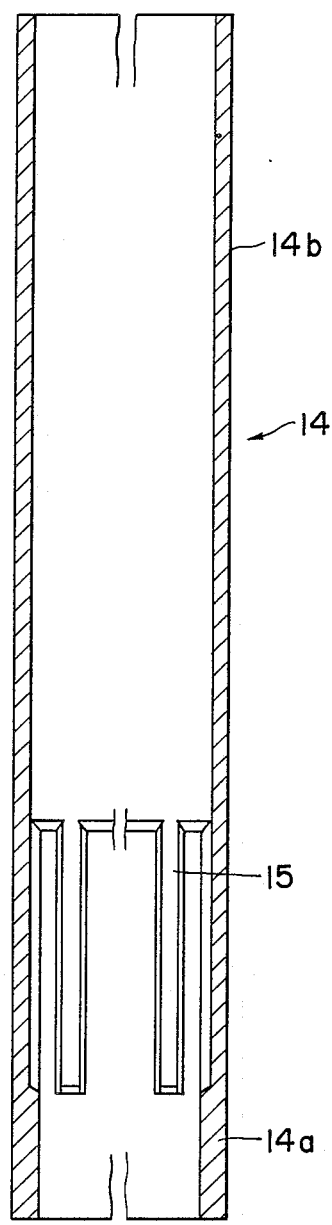
FIG. 16 is an elevational section of the channel box according to the fifth embodiment of this invention.
Figure 17A:
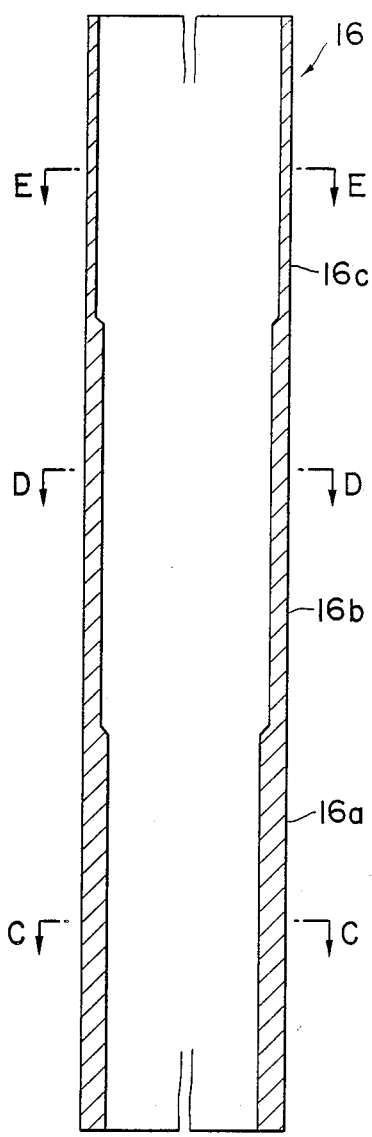
FIGS. 17A and 17B are elevational sections of the channel boxes and FIGS. 17C to 17E are cross sectional views taken along the lines C—C to E—E shown in FIGS. 17A and 17B.
Figure 17B:
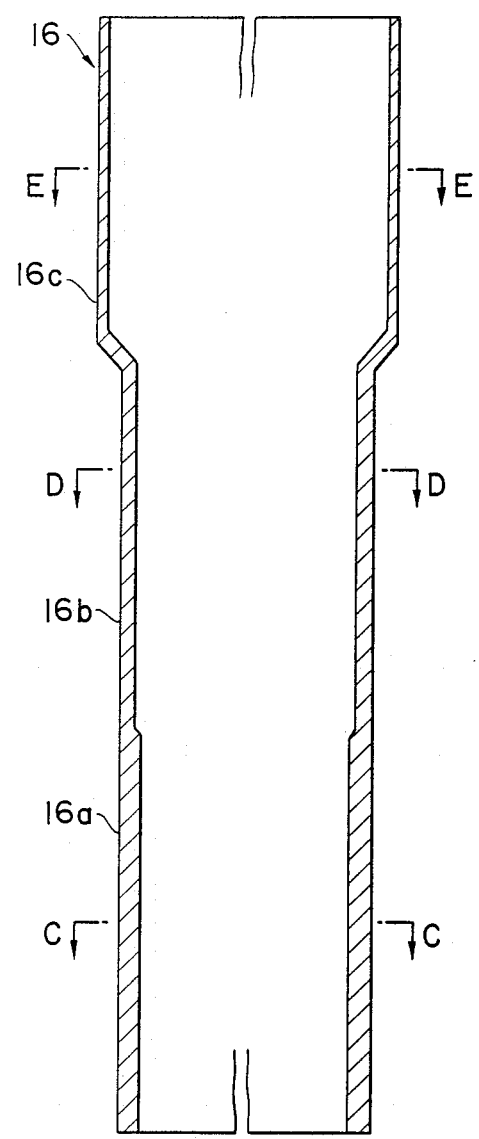
Figure 17E:
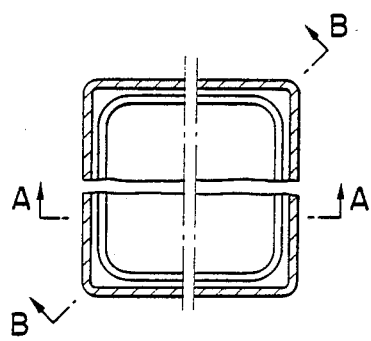
Figure 17D:
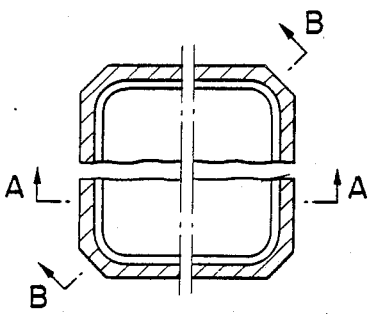
Figure 17C:
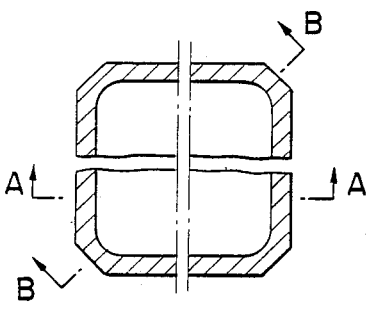

FIG. 16 is an illustration of an elevational section of the fifth embodiment according to this invention, in which the wall structure of the channel box 14 has two stepped portions 14a and 14b having different thicknesses in the axial direction of the channel box 14. This structure of the channel box 14 is effectively available for a reactor plant to which earthquake countermeasures with respect to are particularly required. Although the effect for reducing the pressure loss may be lowered, the structure is made relatively strong with respect to the horizontal stress because the thickness of the wall structure is made relatively large at an upper portion of the channel box 14. The thickened portion 14a is provided with grooves 15 through which the abutment members of the spacers are inserted, and the depth of the groove is made equal to the thickness of the upper portion 14b of the wall structure of the channel box.

Figure 18:
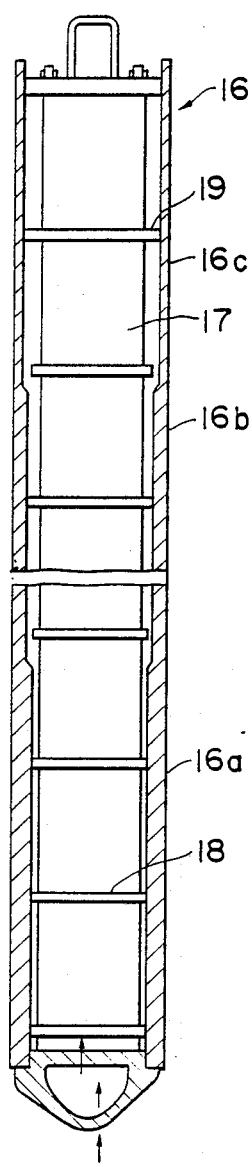
FIG. 18 is an elevational section of a fuel assembly utilizing the channel box shown in FIG. 17.

FIG. 17 further represents the sixth embodiment according to this invention, which is designed by taking into consideration the fact that the value of the maximum stress is reduced by chamfering the corner portions of the respective stepped portions of the channel box, for further making thin the thickness of the channel box 16. In this design of the channel box 16, it will be necessary to remove the fuel rods to be located at the corner portions of the fuel bundle, whereas the corner portions of the upper portion of the channel box 16 in the reactor core area not chamfered as shown in FIG. 17E because of the small stress applied. FIG. 18 is a side view of an elevational section of a fuel assembly utilizing the channel box shown in FIG. 17, and the thickness of the channel box 16 is stepwisely made thin as shown in FIGS. 17A and 17B as portions 16a, 16b and 16c from the upstream side towards the downstream side of the coolant. According to this structure, the coolant passage area can be widened at the corner portions, thus achieving the reduction of the pressure loss of the coolant. In the illustration of FIG. 18, reference numerals 17, 18 and 19 denote the fuel bundle 17, spacers 18 and abutment members 19, respectively.

Figure 19A:
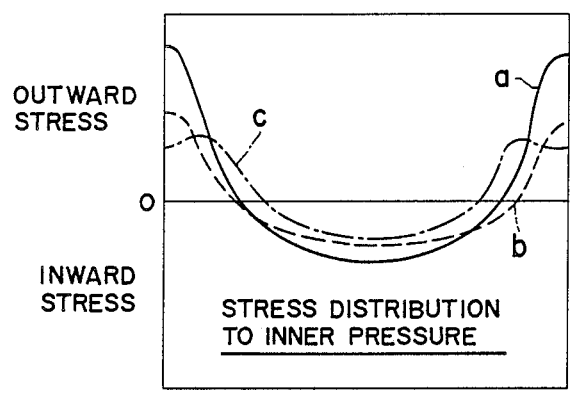
FIG. 19 is a view showing the stress distribution on the basis of the hydraulic pressure of the coolant in the channel box.
Figure 19B:
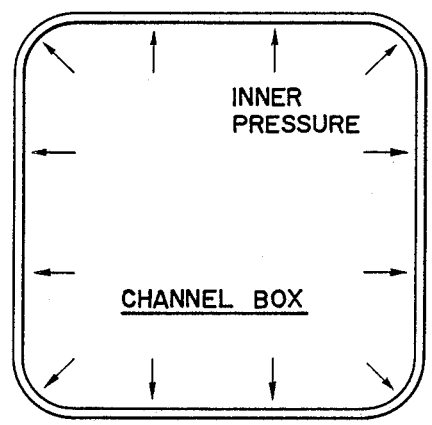

FIG. 19 is a combined view describing the stress distribution on the basis of the inner pressure of the coolant in the channel box. Referring to the graph of FIG. 19, the stress distributions against the inner pressure are represented by the solid line a, by utilizing the conventional channel box, the broken line b, by utilizing the channel box according to this invention provided with large radius R of the corner portion, and the one dot and chain line c, by utilizing the channel box according to this invention provided with chamfered corner portions. As can be understood from this graph, the vertical grooves through which the channel abutment members of the spacers are inserted are formed in the wall portions of the channel box to which the stresses applied are small, so that the location of the grooves does not provide any significant problem for the structure of the channel box.

Figure 20:
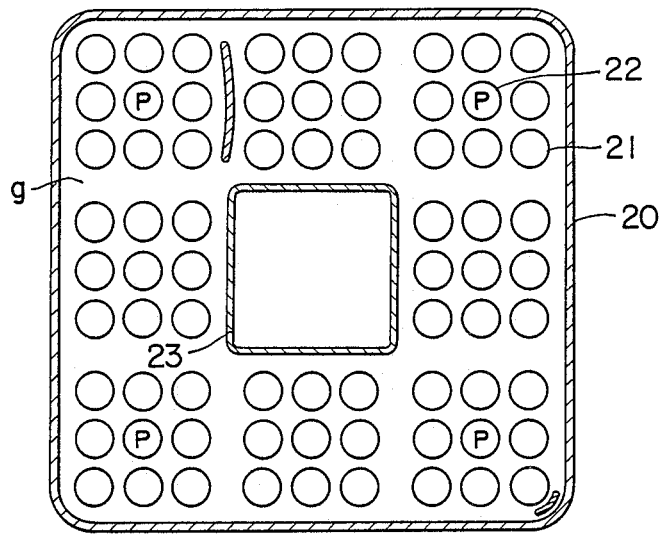
FIGS. 20 to 28 are all cross-sectional views or plan views representing the seventh to fifteenth embodiments according to this invention.

FIG. 20 is a plan view of a fuel assembly of the seventh embodiment according to this invention, in which fuel rods 22 each having a short axial length, called merely partial-length fuel rod or short fuel rod hereinafter and designated by the letter P in FIG. 20, are disposed at portions (2,2) crossing the second line and second row of the fuel rod arrangement in the channel box, thereby improving the presssure loss, and the short fuel rods 22 are provided with aligned lower ends. In order to increase these effects, the outer surface of the square water rod may be shaved as shown in FIG. 10 to expand the coolant flow passage. With the arrangement of this fuel assembly, the coolant is liably to concentrate in the wide gap portions g between the sub-channels, so that the inner surface of the channel box 20 is shaved according to this invention to effectively guide the coolant, hence improving the thermal margin at the corner portion of the fuel assembly. The thermal margin may be further improved by widening the interior space of the channel box. With the channel box of this embodiment, the thickness of the wall structure of the channel box 20 is stepwisely made thin from the upstream side towards the downstream side thereof, though not shown in FIG. 20, a large water rod 23 of square cross section is disposed at substantially the central portion of the channel box 20 and the usual fuel rods other than short ones 22 are denoted by reference numeral 21. In the following embodiments represented by FIGS. 21 to 28, the thickness of the wall structure is also stepwisely made thin from the upstream side, i.e. the lower portion, towards the downstream side, i.e. upper portion, of the channel box, though not specifically described hereunder.

Figure 21:
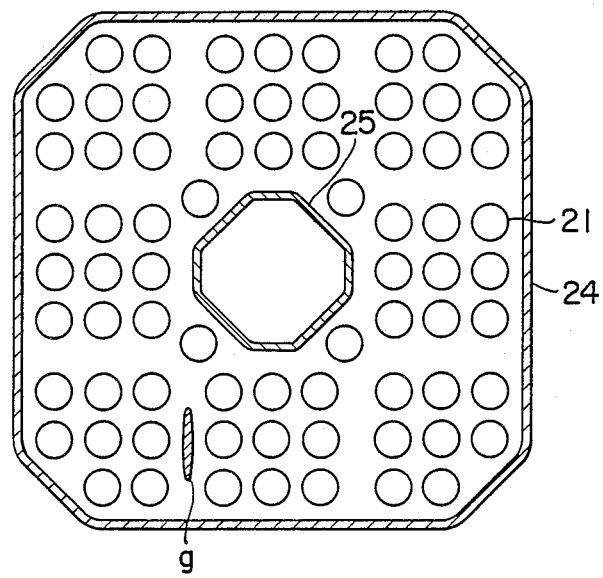

FIG. 21 is a plan view of the eighth embodiment acording to this invention, in which fuel rods 21 at the corner portions of the channel box are transferred to portions opposing the side surfaces of the square water rod 25 arranged centrally in the channel box 24 to avoid the concentration of the coolant near the water rod 25. Even in such an arrangement of the fuel assembly, the coolant is liably to concentrate in the gaps g defined between the respectively adjacent sub-bundles which may prevent the smooth flow of the coolant along the inner surface of the channel box 24. In order to obviate this defect, according to this invention and make the thickness even thinner in the axial direction of the channel box, the corner portions of the channel box 24 are chamfered as shown to reduce the stress due to the inner pressure and hence reduce the thickness of the inner surface of the channel box.

Figure 22:
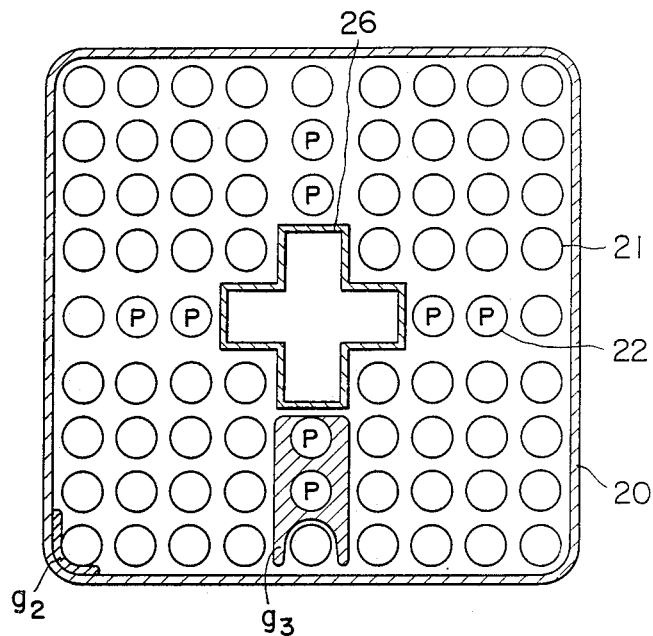

FIG. 22 is a plan view of the ninth embodiment according to this invention, in which a large water rod 26 having a cruciform section is arranged centrally in the fuel assembly and two short fuel rods 22, designated by letter P, are disposed on a line extending from each front end of the cruciform water rod 26. The upper end of each short fuel rod 22 is positioned to be lower than that of the usual fuel rod 21, so that the wide coolant, i.e. water, existing area is formed above the upper ends of the short fuel rods 22 and the water rod 26. Therefore, according to the construction of this embodiment, the reactor shut-down margin can be improved, and the pressure loss due to the coolant can be reduced. The improved void fraction can be attained and the axial output distribution can be also improved. However, the coolant flow is likely to concentrate in the upper portions of the short fuel rods 22 or the gap g3 around the short fuel rods, which may result in the lowering of the cooling ability at portions near the inner surface of the channel, and particularly, at an upper portion of the core (from the upper end to a portion apart therefrom by a distance of ¼ length of the entire length of the core) at the location of the gap g2. This defect may be eliminated by shaving the inner surface of the channel box to allow a large amount of coolant to flow at the upper portion of the core and to improve the cooling characteristics at that portion in the channel box.

Figure 23:
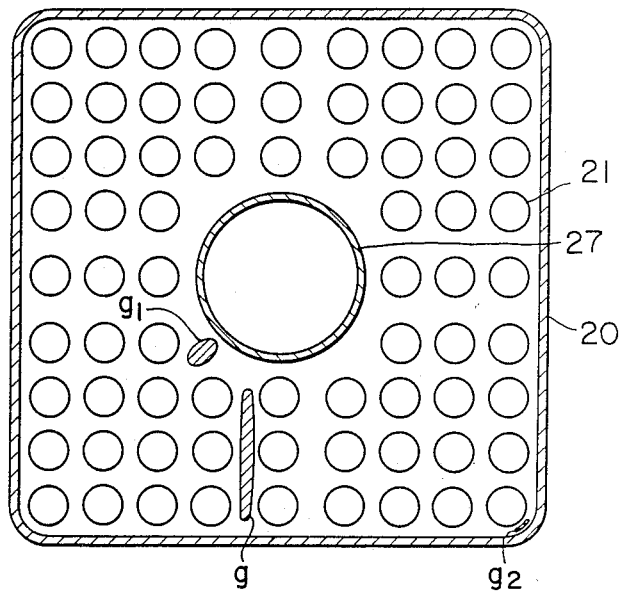

FIG. 23 is a plan view of a fuel assembly of the tenth embodiment according to this invention. Referring to FIG. 23, the coolant is liably to concentrate in gaps g defined between the respective sub-bundles and gaps g1 defined between the inner corner portions of the respective sub-bundles and the outer periphery of the round water rod 27 arranged centrally in the fuel assembly, whereas the coolant flow becomes short in gaps g2 defined between the outer corner portions of the sub-bundles and the channel box 20. This defect can, however, be remarkably improved by providing the channel box having the reduced wall thickness according to this invention.

Figure 24:
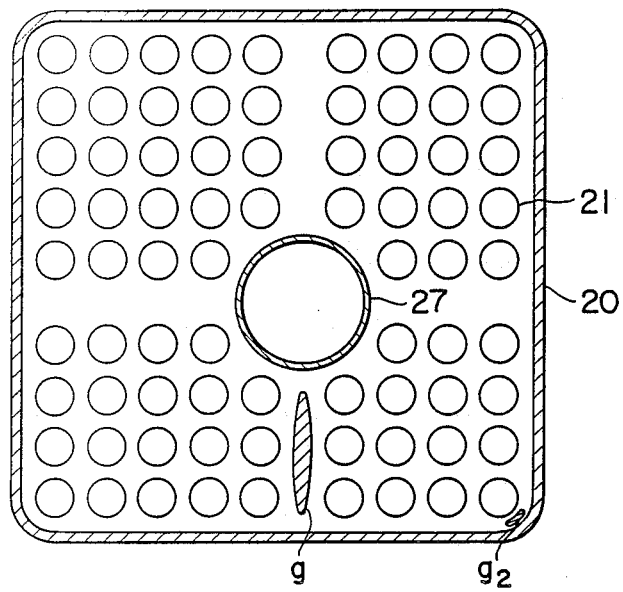

FIG. 24 is a plan view of the eleventh embodiment according to this invention, generally called BWR-D lattice type fuel assembly, in which water gaps around the fuel assembly are wide and narrow gaps and in which a large water rod 27 is shifted from the central portion of the channel box 20. With such an arrangement of the water rod 27 and the fuel rods 21, the coolant is likely to concentrate in the gaps g defined between the respective sub-bundles, whereas the coolant becomes short in gaps g2 between the channel box 20 and the corner portions of the respective sub-bundles. This defect can be remarkably improved by providing the channel box with a structure according to this invention described hereinbefore.

Figure 25:
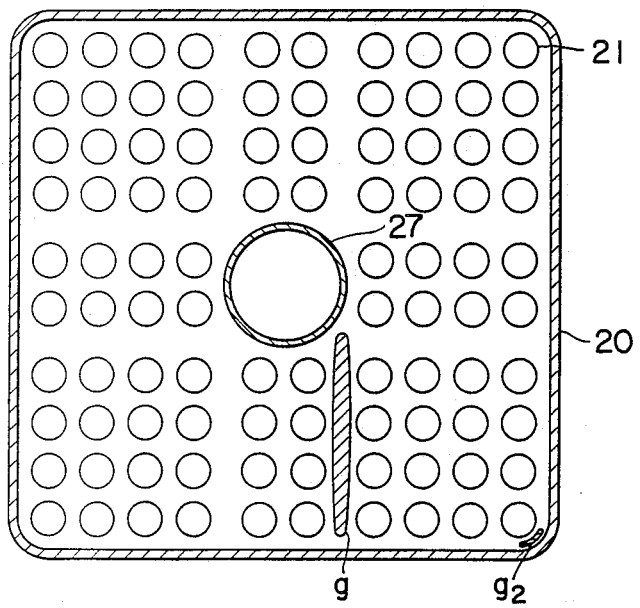

FIG. 25 is also a plan view of a fuel assembly of the twelfth embodiment according to this invention, in which, as described with reference to FIG. 24, the coolant is likely to concentrate in gaps g between the respective sub-bundles, whereas becomes short in gaps g2 between the inner surface of the channel box 20 and the corner portions of the respective sub bundles. This defect can be also improved by providing the channel box having a reduced wall structure according to this invention as described hereinbefore.

Figure 26:
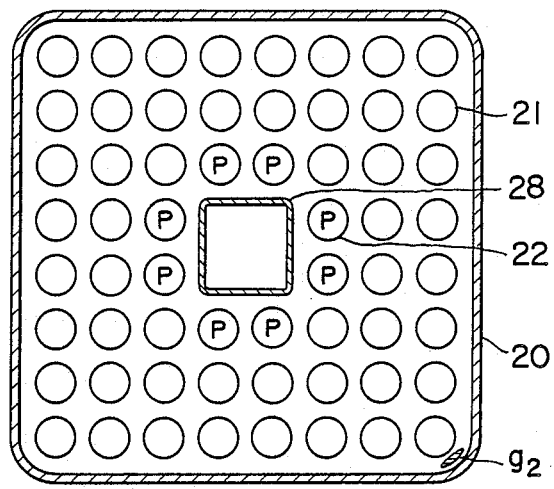

FIG. 26 is a plan view of a fuel assembly of the thirteenth embodiment according to this invention, in which fuel rods 21 are disposed in eight line and eight row arrangement and a square water rod 28 having a size corresponding to four (2×2) fuel rods 21 is centrally arranged in the channel box 20. Eight short fuel rods 22(P), respectively two, are disposed at portions opposing the side surfaces of the square water rod 28. Each short fuel rod 21 has a length ⅔ of the length of the usual fuel rod 21 and a space is formed above these short fuel rods 22 through which the coolant flows. The fuel assembly of this embodiment is designed as a highly economical fuel assembly for the improvement of the reactor shut-down margin, improvement of the axial power distribution or axial power shape flattening, reduction of the pressure loss and improvement of the void fraction. The tendency of the concentration of the coolant flow in the upper portion of the short fuel rods 22 can be improved by shaving the inner surface of the channel box 20 to improve the coolant flow near the inner surface thereof in the channel box 20.

Figure 27:
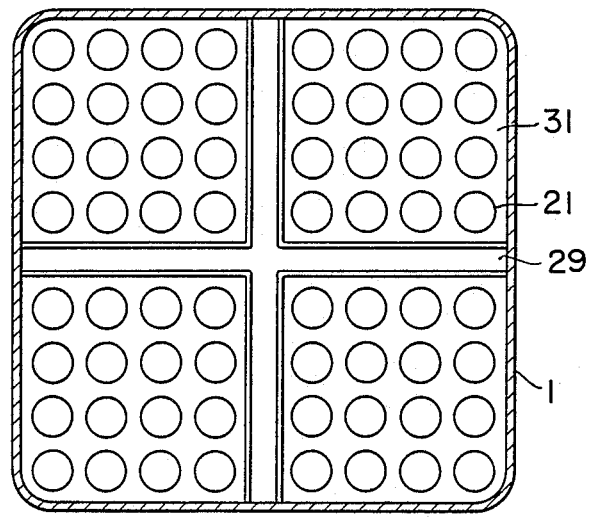

FIG. 27 is a plan view of a fuel assembly of the fourteenth embodiment according to this invention, which is divided into four sub bundles by the location of a cruciform channel member 29. Each sub-bundle 31 is configured by sixteen fuel rods in four line and four row arrangement. Non-boiling water moderator flows in the channel member 29 and boiling water coolant flows in the respective sub-bundles 31. The inner surface of the channel box 1 is shaved so that the passage through which the boiling coolant flows is widened towards the downward direction. Namely, the thickness of the wall structure of the channel box 1 is stepwisely made thin from the upstream side towards the downstream side of the coolant flow.

The sub-bundle may be of course configured by the fuel rod arrangement other than 4×4 arrangement, and a large water rod may be further arranged in the non-boiling moderator existing area.

Figure 28:
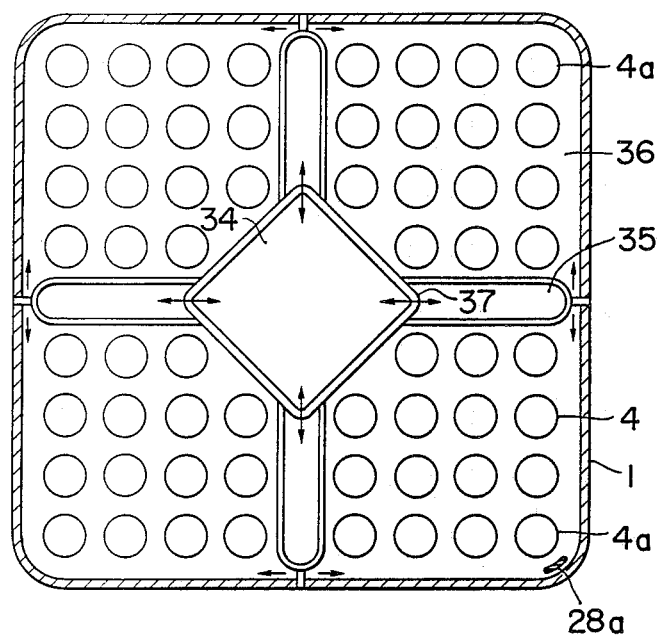

FIG. 28 is a plan view of a fuel assembly of the fifteenth embodiment according to this invention, in which a large water rod 34 square in cross section having a size corresponding to four fuel rods 4 is arranged in a rotated manner with an angle of 45° at substantially the central portion of the channel box 1. The square water rod 34 is provided with four channel members 35 extending from the respective corner portions of the square water rod 35 in a cross shape to thereby divide the interior of the fuel bundle into four sub-bundles 36 each in which the fuel rods 4 are arranged in four line and four row arrangement, but with the innermost fuel rods of the respective sub-bundles eliminated to locate the central water rod 34. Non-boiling water, as a moderator, flows in the water rod 34 and the channel members 35 and the boiling water flows in the respective sub-bundles 36. The inner surface of the channel box 1 is stepwisely shaved so that the passage through which the boiling coolant flows is widened towards the downstream side of the coolant, and the square water rod 34 and the cruciform channel members 35 are also shaved stepwisely for the same purpose. Water pass ports 37 are formed in the respective corner portions of the square water rod 34.

According to the structure of the fuel assembly of this fifteenth embodiment, an even flow of the coolant 28a at a portion between the corner fuel rod 4a and the channel box 1 can be achieved. The increase of the coolant flow passage area improves the reactor shutdown margin and the pressure loss can be reduced. Moreover, the void fraction and the axial power distribution can be also remarkably improved.

Figure 29:
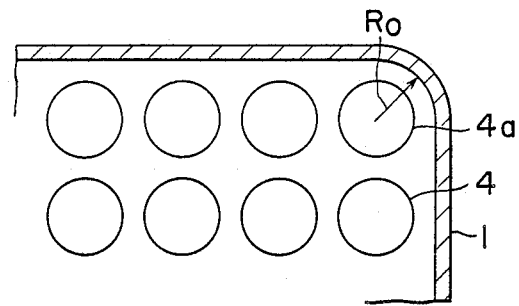
FIG. 29A is a partial plan view showing a corner portion of a conventional channel box.
FIGS. 29B and 29C are partial plan views similar to that shown in FIG. 29A but according to this invention.
Figure 29:
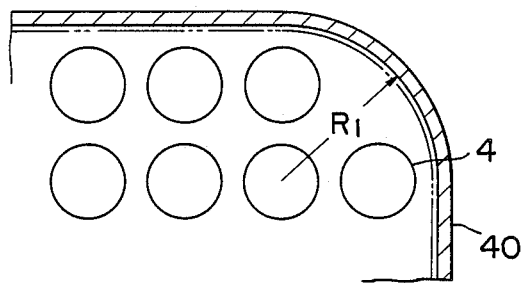
Figure 29:
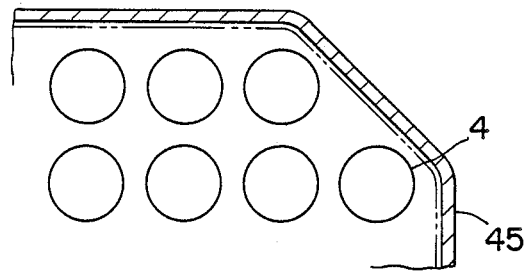

The prevention of the lowering of the cooling ability at the corner portions of the fuel bundle will be further discussed hereunder with reference to FIG. 29.

FIG. 29A is a partial plan view of a corner portion of a fuel assembly of a conventional structure in which fuel rods 4 are uniformly arranged in a square channel box 1. Now, in case a corner fuel rod 4a in FIG. 29A is eliminated, the radius of curvature of the inner surface of the corner portion of the channel box increases from $R_0$ mm to $R_1$ mm ($R_0 < R_1$) as shown in FIG. 29B. As the result, the inner pressure stress at the corner portion is lowered, so that the thickness of the wall structure of the channel box can be made thin, and hence, in consideration of the entire structure of the channel box of the in-channel-area enlargement type, the cooling characteristics at the outer periphery of the loose and tight lattice arrangement can be improved. On the other hand, in consideration of the entire structure of the channel box of the out-channel-area enlargement type, the non-boiling area is increased, the reactivity increases during the high-temperature power operation period, and the control blades can be easily inserted or withdrawn. In addition, these advantageous effects can be further improved by chamfering the corner portions of the channel box as shown in FIG. 29C.

Figure 30:
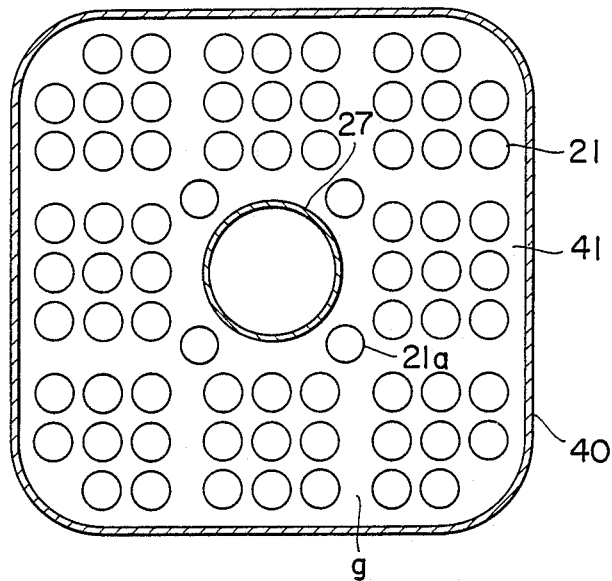
FIGS. 30 to 35 are all cross sections or plan views of the sixteenth to twenty first embodiment according to this invention.

FIG. 30 is a plan view of a fuel assembly of the sixteenth embodiment according to this invention in consideration of the technique described above.

Referring to FIG. 30, the fuel assembly of this embodiment includes a channel box 40 having a uniform outer configuration in which a large water rod 27 is arranged at a substantially central portion of the channel box 40 and a fuel bundle of the coarse and dense arrangement is inserted into the other space into the channel box 40. The fuel bundle is divided into a plurality of sub-bundles 41 (nine in the illustrated embodiment) each including fuel rods 21 in three line and three row arrangement with spaces therebetween. Fuel rods 21a to be located at the respective corner portions of the channel box 40 are removed and transferred to portions opposing the outer periphery of the large water rod 27.

According to the structure of this embodiment, since the radius of curvature of the corner portion of the channel box is increased, the thickness of the wall structure of the channel box can be made thin, thereby reducing the parasitic absorption of neutrons and hence the fuel cycle cost (FCC). In addition, the enlargement of the inner surface of the channel box results in the improvement of the cooling ability of the fuel rods disposed at the outer periphery of the fuel bundle and ensures the soundness of the fuel. Moreover, because of the increasing in the radius of curvature at the corner portion the non-boiling water somewhat approaches the interior of the bundle in comparison with the conventional structure, so that the reactivity can be improved. Therefore, the diameter of the large water rod 29 arranged at the central portion of the bundle may be somewhat reduced, so that the insertion of the corner fuel rods 21 into a space, as fuel rods 21a, near the outer periphery of the water rod 27 can be easily carried out, thus preventing the reduction of fuel inventory. The location of the fuel rods 21a in the wide water gap portion near the water rod 27 can effectively suppress the concentration of the coolant in this gap portion, thus effectively attaining the uniform cooling effect for the fuel rods in the bundle and hence improving the soundness of the fuel.

Figure 31:
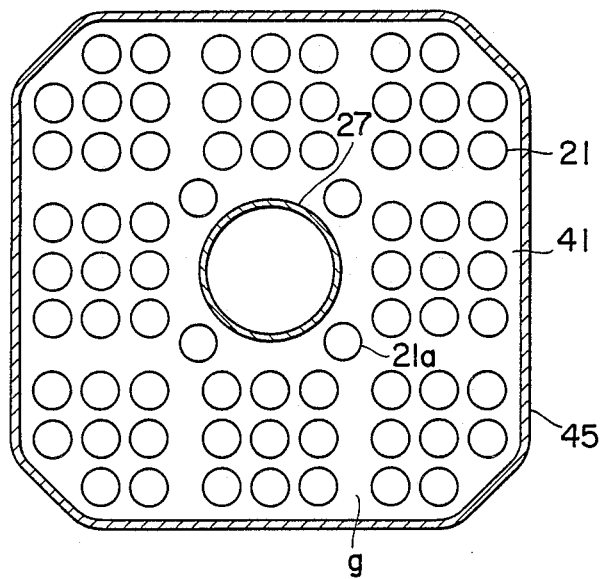

FIG. 31 is a plan view of the seventeenth embodiment according to this invention, which is merely different from the embodiment shown in FIG. 30 in the point that the outer surfaces of the corner portions of the channel box are chamfered, and accordingly, like reference numerals are added to elements or members corresponding to those shown in FIG. 30 and the detailed description thereof is now omitted herein.

Figure 32:
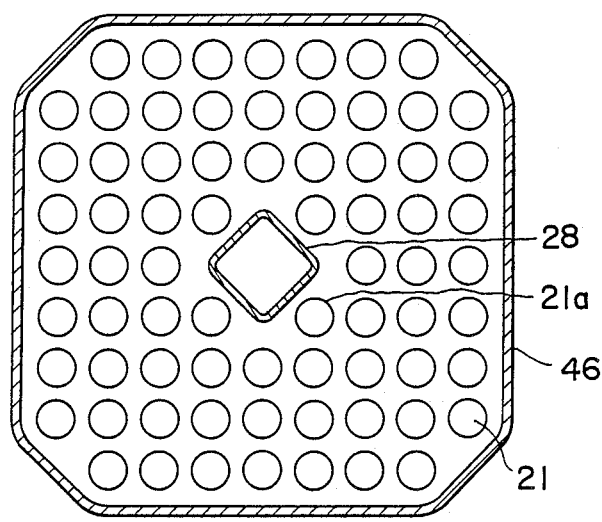

With the structures of the channel boxes shown in FIG. 16 and of the conventional type, outward stresses are generated at the corner portions thereof and inward stresses against the inner pressure are generated at the side portions thereof except portions near the corner portions, but with the structure of the channel box shown in FIG. 32, inward stresses are generated at the linearly chamfered corner portions, so that the aforementioned outward stresses are largely weakened. Accordingly, the thickness of the channel box can be made further thin.

FIG. 32 is a plan view of a fuel assembly of the eighteenth embodiment according to this invention, in which a square water rod 28 is arranged at the central portion of a channel box 46 and a plurality of fuel rods 21 are uniformly arranged in the space not occupied by the water rod 28. The corner portions of the channel box 46 are linearly chamferred. With the fuel assembly of this embodiment, the fuel rods 21 are arranged with uniform pitches and the corner fuel rods 21a are transferred to portions opposing the side surfaces of the square water rod 28 to prevent the lowering of the inventory, so that the size of the square water rod 28 is somewhat reduced in comparison with that of the other embodiment.

Figure 33:
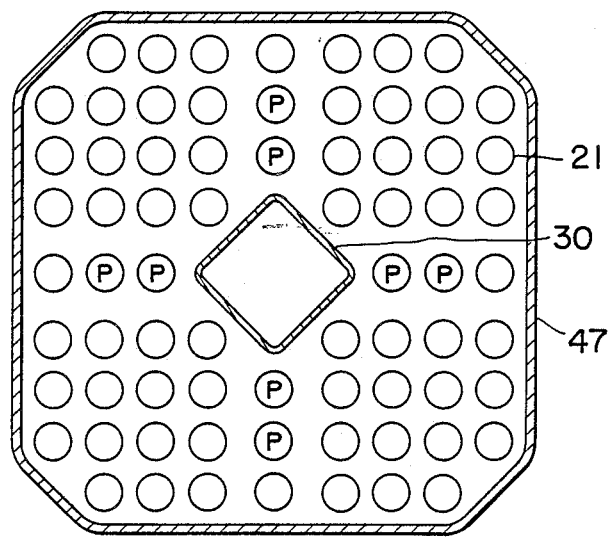

FIG. 33 is a plan view of a fuel assembly of the nineteenth embodiment according to this invention, in which the corner portions of the channel box 47 are linearly chamfered and the fuel rods disposed in loose and tight arrangement, i.e. 4-1-4 arrangement, so that a relatively large square water rod 30 may be arranged at the central portion in the channel box 47. According to this embodiment, since the corner portions of the channel box 47 are linearly chamfered, the thickness of the wall structure of the channel box can be made thin and since the fuel rods are disposed in loose and tight arrangement, the relatively large square water rod can be located. In addition, the non-boiling water existing near the corner portions of the channel box can be guided into the inner portion of the fuel bundle, so that the effective neutron multiplication factor Keff can be improved. Since the fuel rods to be arranged to the corner portions of the channel box are removed, the cooling ability at these portions can be improved. The adaption of the relatively large water rod can suppress the concentration of the coolant in the portion near the water rod. The cooling effect can thus be uniformly achieved and the soundness of the fuel can be also improved. Moreover, fuel portions in the fuel rods disposed in gaps extending outwardly from the corner portions of the square water rod are removed at portions at which the reactor shut-down margin is hardly maintained, so that the maintenance of the reactor shut-down margin can be remarkably improved. The pressure loss can be further reduced by constructing the fuel rods P as short fuel rods by cutting out the upper portions thereof as vanishing mode.

Figure 34:
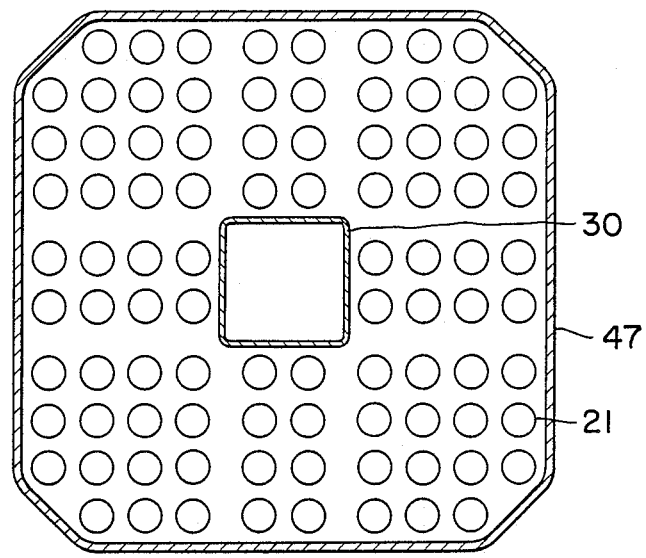

FIG. 34 is a plan view of a fuel assembly of the twentieth embodiment according to this invention, in which fuel rods are disposed in a loose and tight arrangement, i.e., 4-2-4 arrangement, and a larger square water rod 30 is disposed at the central portion of the channel box 47 having corner portions linearly chamfered. With this embodiment, the fuel rods are arranged in ten lines and ten rows, so that the lowering of the inventory can be reduced even if the fuel rods are removed from the corner portions of the channel box 47, thus attaining advantageous effects more effectively by the chamfered structure of the corner portions of the channel box 47.

Figure 35:
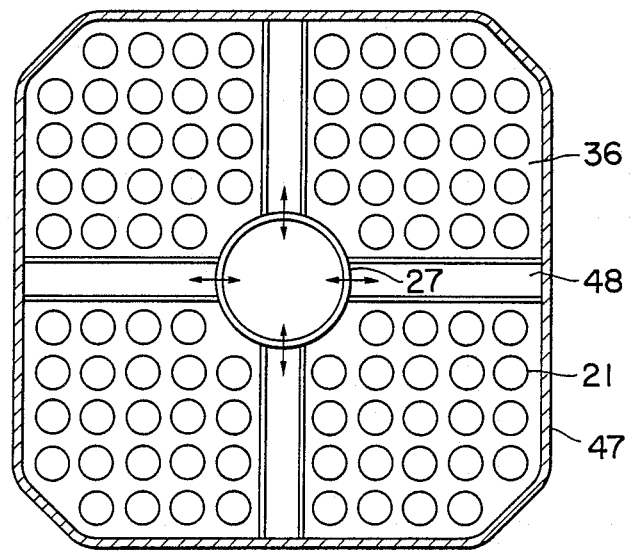

FIG. 35 is also a plan view of a fuel assembly of the twenty-first embodiment according to this invention, in which a large water rod 27 is arranged at the central portion of the channel box 47 and fuel rods are disposed in ten line and ten row arrangement. The interior of the channel box 47 is evenly divided into four sub-bundles 36 by locating a cruciform channel member 48. The non-boiling water moderator flows in the water rod 27 and the channel member 48 and the boiling water coolant flows in the sub-bundles 36.

What is claimed is:

1. A fuel assembly for a nuclear reactor comprising:
a fuel bundle in which a plurality of fuel rods are arranged by utilizing spacer means;
a channel box disposed so as to surround an outer periphery of said fuel bundle and conduct a coolant flow, said channel box including a wall structure having a thickness gradually decreasing from the upstream side of the coolant flow towards the downstream side thereof so that an inner cross sectional area of the channel box increases from an upstream side of the coolant flow towards the downstream side thereof; and
means for maintaining a distance between the spacer means and an inner surface of the channel box wall structure.

2. The fuel assembly according to claim 1 wherein the wall structure of said channel box has an axial length L and said axial length L is divided into a lower portion having an axial length of ¼ to ⅓ length of the length L, an intermediate portion, and an upper portion having an axial length of at least ¼ length of the length L, said lower portion having a thickness larger than that of the intermediate portion and said upper portion having a thickness smaller than that of the intermediate portion.

3. The fuel assembly according to claim 1 wherein said channel box is provided with corner portions each chamfered with a radius of curvature to an extent such that fuel rods to be inserted into portions opposing said corner positions are to be removed, wherein said chamfered corner portions are disposed only within the lower ¾ of the axial length L of the channel box.

4. The fuel assembly according to claim 1 wherein said channel box is provided with corner portions each linearly chamfered to an extent such that fuel rods to be inserted into portions opposing said corner portions are to be removed.

5. The fuel assembly according to claim 1, wherein said distance-maintaining means abut against the spacer means and are disposed on an inner surface of the wall structure of said channel box except on a portion of the wall structure having a maximum wall thickness.

6. The fuel assembly according to claim 1 wherein said distance-maintaining means abut against an inner surface of the wall structure of said channel box except a portion of the wall structure having a maximum wall thickness and are disposed at an outer periphery of said spacer means.

7. The fuel assembly according to claim 6 wherein the inner surface of said channel box except a minimum wall thickness portion, is provided with axial passage means for said distance-maintaining means to be inserted therethrough.

8. The fuel assembly according to claim 1, further comprising a water rod arranged in the fuel bundle and having a wall structure, wherein an outer surface of said water rod wall structure is shaved from the upstream side of the coolant flow towards the downstream side thereof to make gradually thin the thickness thereof.

* * * * *